Jan. 9, 1968  W. G. PFANN ETAL  3,362,898
EUTECTIC SEPARATION USING AN ELECTRIC FIELD
Original Filed Feb. 1, 1962  3 Sheets-Sheet 1

INVENTORS W. G. PFANN
R. S. WAGNER
BY
ATTORNEY

Jan. 9, 1968  W. G. PFANN ET AL  3,362,898
EUTECTIC SEPARATION USING AN ELECTRIC FIELD
Original Filed Feb. 1, 1962  3 Sheets-Sheet 3
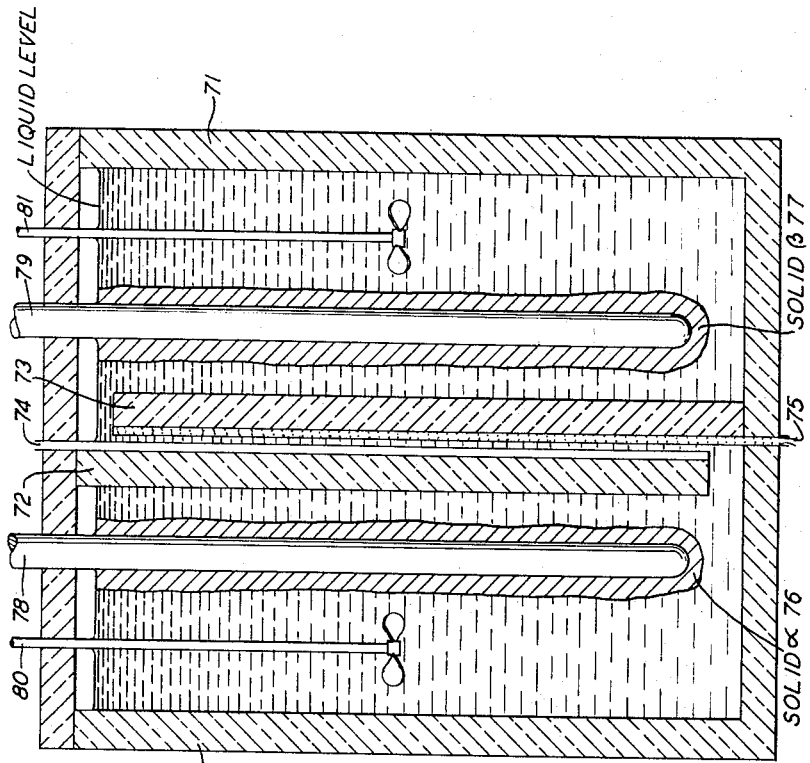
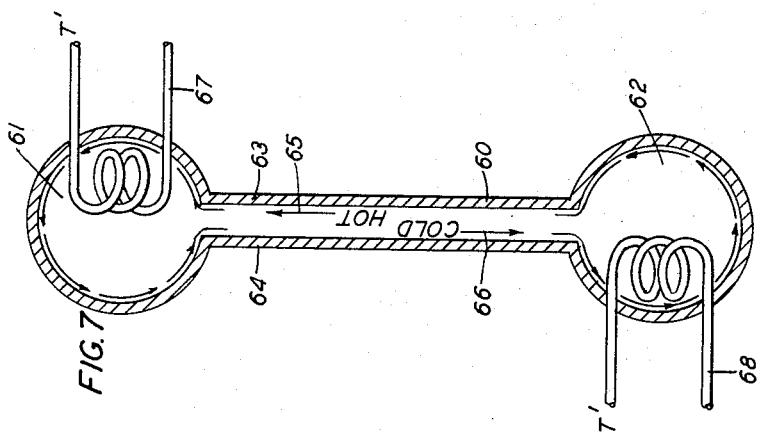
INVENTORS W. G. PFANN
BY R. S. WAGNER
*George S. Indig*
ATTORNEY United States Patent Office 3,362,898
Patented Jan. 9, 1968

3,362,898
EUTECTIC SEPARATION USING AN
ELECTRIC FIELD
William G. Pfann, Far Hills, and Richard S. Wagner,
Basking Ridge, N.J., assignors to Bell Telephone Laboratories, Incorporated, New York, N.Y., a corporation of New York
Continuation of application Ser. No. 170,457, Feb. 1, 1962. This application Nov. 3, 1966, Ser. No. 591,922
8 Claims. (Cl. 204—180)

ABSTRACT OF THE DISCLOSURE

Minimum melting point solutions such as eutectics are separated under the influence of a D-C electric field while maintaining the solution at a temperature intermediate that of the melting point of the total composition and a desired end product.

This application is a continuation of application Ser. No. 170,457, filed Feb. 1, 1962, now abandoned.

This invention relates to the separation of the components of eutectic and other minimum melting point compositions. The inventive processes are applicable to the separation of elements such as metals and semiconductors, as well as compounds such as oxides and salts, and also to combined systems containing one or more components from each of the foregoing classes.

In general, the processes herein may be utilized in the separation of any type of system providing (1) it is capable of undergoing a phase transformation from liquid to solid, and (2) that the components have a characteristic difference of a type which will permit a redistribution, no matter how slight, by the application of a unidirectional field across the liquid. While in the preferred embodiment the external field takes the form of an electrical field and the characteristic difference in the components takes the form of a differential ionic mobility, other types of fields, suitably applied to take advantage of different component characteristics, are set forth herein. One other such field discussed specifically, and to which an example is directed, makes use of a thermal gradient. Other fields include gravitational, magnetic, et cetera.

While it is recognized that all of these influences, together with resulting redistributions, have been observed in systems of the classes here under consideration, these effects have thus far been of scientific interest only, largely by virtue of the fact that the redistributions so effected are generally small and serve only to illustrate the principles involved.

These separation mechanisms, however, attain practical significance when means is provided for progressively removing the redistributed components with continuous application of the field. It is common to all of the processes herein that the progressive removal of such components results from the maintenance of a temperature here designated "T'" at at least one position within the liquid body corresponding with a point at which the distributing effect is such as to result in a composition having a liquidus temperature equal to or higher than T'. It will be seen that, by this expedient, distributed components are continuously removed, often resulting in a steepening of the gradient produced by the field along the decreasing path length defining the remaining liquid between two such freezing interfaces.

While the invention is described largely in terms of the separation of such a eutectic or minimum-point mixture, it is to be recognized that the mixture need not have an initial composition exactly corresponding with such minimum point. It will be shown that an advantage in separation accrues from operation on compositions having a liquidus temperature substantially higher than the minimum point.

It is convenient to discuss the invention and the broad range of suitable systems to which the invention is applicable in uniform terms. For these purposes the term "eutectic" is to be understood as including minimum-point mixtures in general, of course assuming increasing liquidus temperatures as the composition deviates from the minimum point. A non-eutectic minimum-point mixture is exemplified in the Nb-Zr system. The term "components" is intended to include the ingredients of any such eutectic system, whether they be elements or compounds. As has already been mentioned, the inventive processes require the application of a field which, by its nature, has a redistribution effect on the components of the system being separated. Hence, while the field so applied may be electrical, thermal, gravitational, et cetera, it must be of such nature as to result in a composition gradient within the liquid body to which it is applied. While persons skilled in the art are in general familiar with the magnitude of effects that may be obtained by the application of specific fields to specific systems, it is seen that to be useful for the purposes herein the resulting redistribution must be sufficient to produce a compositional change such that at at least one position in the liquid a composition having a liquidus temperature higher than some practical value of T' is obtained. For these purposes, a T' differing from the eutectic or low melting temperature, $T_e$, by 1° C. is considered adequate.

In summation, component separation of a liquid-phase eutectic system is achieved by the application of a field capable of producing a redistribution in the liquid sufficient to result in a local composition having a liquidus temperature at least equal to a temperature T', representing a value at least 1° C. higher than the eutectic or minimum temperature $T_e$ while maintaining the liquid at the said temperature T' at least in the region corresponding with the attainment of such liquidus composition.

The description is facilitated by reference to the drawing, in which:

FIG. 1, on coordinates of temperature and composition, is a binary diagram for a system having a classical eutectic compositional point;

FIG. 2, on the same coordinates, is a binary diagram of a system having a compositional point manifesting a minimum value of liquidus temperature, deviation from which compositional point in either direction results in an increase in liquidus temperature;

FIG. 3A is a schematic cross-sectional view of one type of apparatus suitable for the practice of the present invention;

FIG. 3B, on coordinates of component concentration and distance, is a corresponding plot of the concentration gradient resulting in the apparatus of FIG. 3A;

FIG. 3C, on coordinates of liquidus temperature and distance, is a plot showing the liquidus temperature variation along the gradient produced by the application of the field in the apparatus of FIG. 3A;

FIG. 7 is a schematic view of a Clusius column intended for the separation of eutectic systems by application of a thermal field; and FIG. 8 is a front elevational view, partly in section, of an alternate form of apparatus suitable for the separation of components under the influence of a thermal field.

In large part, the detailed description of the invention, including many of the figures, is in terms of the use of an electrical field. A description in these terms is not only expedient but is particularly suitable in that the preferred embodiment herein makes use of such an electrical gradient. However, description in these terms is not to be considered as limiting the scope of the invention, it being recognized that the principles discussed apply equally well to the application of fields of the other types discussed herein, many of which are suitably applied in the apparatus depicted.

Figure 1:
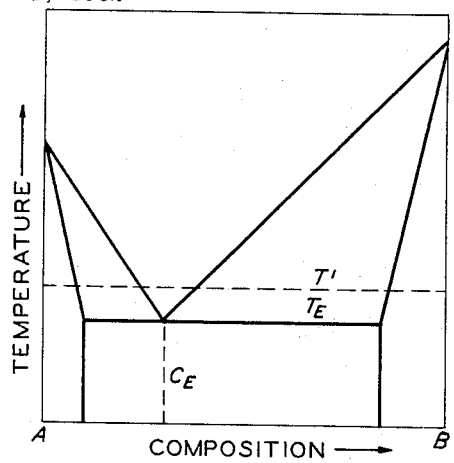

Referring now to FIG. 1, the binary diagram presented is that of a simple eutectic system of two components A and B. The designations $T_e$ and $C_e$ refer respectively to eutectic temperature and eutectic composition. The symbol $T'$ has already been discussed.

Figure 2:
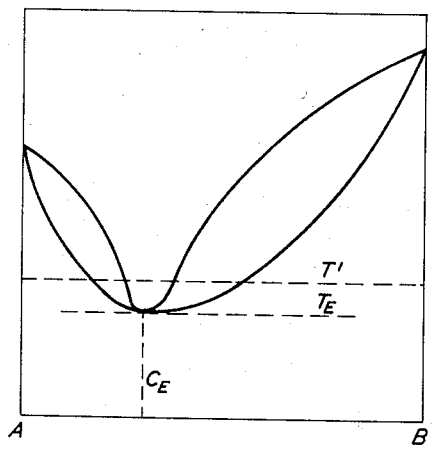

FIG. 2 is a binary diagram of a simple two-component system, again referred to as A and B, however manifesting a minimum liquidus temperature and composition for expediency also designated $T_e$ and $C_e$, respectively, the symbol $T'$ again representing a temperature intermediate $T_e$ and the melting point of at least one of components A and B. It is recognized that components of compositions $C_e$ of either of the systems shown on FIGS. 1 and 2 are not readily amenable to separation by physical means. The two systems for which binary diagrams are presented exemplify materials to which the invention is applicable. Of course, eutectic compositions occur in systems having more complex compositional diagrams, either with or without partial liquid-solid solubility. Such systems include ternary or higher order mixtures of elements or compounds, as well as higher order systems containing one or more components of either class. The processes and apparatus herein are equally applicable to all such systems.

Figure 3A:
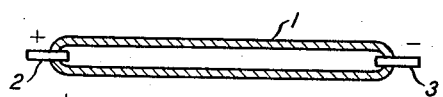

At this point in the description of the invention, it is convenient to refer to the simple apparatus depicted in FIG. 3A. While this apparatus may be applied efficiently to the separation of conductive elemental systems, it will be seen that one or other of the alternate forms depicted in subsequent figures may more expediently be applied to the separation of systems showing proportionality as compared with electronic conductivity. The principles here discussed are, however, applicable to all systems upon which the invention may be practiced.

The apparatus of FIG. 3A consists simply of a capillary tube 1 of a bore of 1 or 2 millimeters filled with liquid metal of the eutectic composition $C_e$ and having sealed inert electrodes 2 and 3, as shown. In practice, provision must generally be made for expansion or contraction during processing. Such provision, which may take the form of sliding joints, flexible members, or simply a portion of unfilled tube is, for simplicity, omitted. Redistribution is effected by producing a unidirectional electrical field of at least 0.02 volt/cm., which may preferably be of the order of from about 0.1 to 1.0 volt/cm. length in the direction of field, across the liquid by the passage of direct current between the electrodes 2 and 3 by means of current source, not shown. Since the conductivity of liquid metals is of the order of $10^4$ ohm$^{-1}$ cm.$^{-1}$, the current density is typically of the order of about $10^3$ amp/cm.$^2$ or higher.

For the exemplary binary metallic system treated, the current responsible for the field is carried almost entirely by electrons. However, metallic ions have a small but definite mobility which may be as high as of the order of $10^{-3}$ cm.$^2$ volt-sec. Any such cations tend to move toward the negative electrode under the influence of the applied field. For the system under consideration, however, two metallic cation species are present, it being assumed that their differential mobility is of the order of at least $3 \times 10^{-5}$ cm.$^2$/sec. for the field applied, and this is a general requirement for components of systems which are to be separated in accordance with the instant invention by the use of an electrical field. Although both cation species have a tendency to move in the direction of the negative electrode 3, that species having the greater mobility, here assumed to be the B ions, displaces the slower A ions from the vicinity of the negative cathode. In time, assuming the absence of convection and a sufficiently high temperature to prevent freezing, a steady state continuous gradient of concentration with maximum B ion concentration in the vicinity of the negative cathode is established along the tube. Under certain simplifying assumptions, this gradient is exponential in form. The steady state condition owes its existence to the limitation of movement of B ions under the influence of the applied field by back diffusion.

Figure 3B:
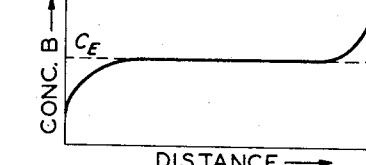
Figure 3C:
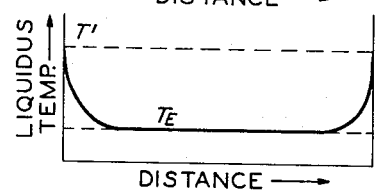

The situation discussed in the preceding paragraph obtains only under the temperature condition noted, that is, a temperature throughout the tube at all times greater than any liquidus temperature which may obtain. To accomplish the continuing separation upon which the inventive processes depend, the liquid within tube 1 is at least locally maintained at a temperature $T'$ which is above the eutectic temperature $T_e$, but which is below the liquidus temperature of some composition resulting from the redistribution effected by the applied field, at least in the vicinity in which this composition is produced. In a simplified case, which finds practical application where separation is brought about under the influence of an electrical field, it is convenient to maintain the entire body of liquid within the tube at such temperature $T'$ which may be chosen 5 or 10 degrees above $T_e$, as shown in FIG. 1. Under these conditions, the solute distribution at an early stage of the process (before freezing) is as represented in FIG. 3B, and the corresponding liquidus temperatures are as shown in FIG. 3C. For the conditions shown, the exponential distribution brought about by the application of field has resulted in the attainment of a B-rich composition in the vicinity of the negative electrode having a liquidus temperature equal to $T'$. This results in the freezing of an increment of the liquid at the cathode and a consequent enrichment of the remaining liquid with respect to A. This, in turn, under the influence of the field, results in a steepening of the gradient in the vicinity of the anode, so in time resulting in the attainment of a liquidus temperature $T'$ and the commencement of freezing at that electrode.

From this time on, the rates of growth of $\alpha$ and $\beta$ solid solutions are determined by the fluxes of A and B ions arriving at the freezing interfaces, which latter are, in turn, direct functions of the field and of the differential mobility. Eventually, the entire body of liquid freezes, forming two sections, one of $\alpha$, the other of $\beta$, and the eutectic mixture is separated into its component phases.

It is evident at this point that the compositions of the $\alpha$ and $\beta$ phases are determined by $T'$ or, more generally, by the temperature or temperatures at which the freezing interfaces are maintained. It is clear that increasing the magnitude of $T'$ results in more complete separation of the eutectic system into the components A and B, with ultimate distribution being obtained for those conditions under which these temperatures correspond with the liquidus temperature for the most highly enriched $\alpha$ and $\beta$ phases which may be obtained under the particular field and back diffusion conditions chosen. In general, since more economical and highly efficient separation procedures are available for the processing of non-eutectic mixtures, it appears desirable to set $T'$ at a minimum value, for example of the order of as little as 1°C. above the eutectic temperature, for carrying out further purification of $\alpha$ or $\beta$ by use of zone melting or other well-known procedure.

Certain simplifying assumptions have been made. For example, while for most metals the electrical and thermal conductivities are greater in the solid than in the liquid phase, so resulting in stable junctions, the reverse is generally true of semiconductive systems. Interfaces may be stabilized by the use of external temperature fields or the problem can be avoided by freezing outside of the electrical path, so avoiding the passage of current through the liquid-solid interface (see FIG. 5 and related discussion).

The apparatus of FIG. 3A utilizes a liquid column of small bore. This is particularly advantageous for metallic systems since the Joule heating resulting from the large electronic flow required to produce the requisite field, in turn, demands either across section of large surface to area ratio or forced cooling. The small bore is useful, too, in minimizing convective mixing. If the liquids at the ends of the column differ in density, mixing may be further reduced by inclination of the tube.

Figure 4:
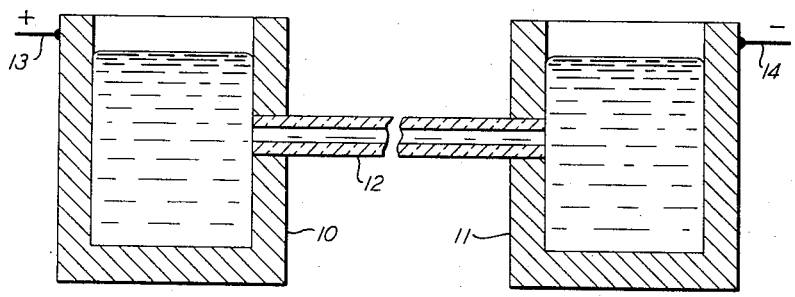
FIG. 4 is a front elevational view, in section, of an alternate form of apparatus suitable for the practice of the inventive process herein, differing from the apparatus of FIG. 3A in the provision of reservoirs.

The advantages which accrue from use of a capillary tube are retained in the apparatus of FIG. 4, which is at the same time provided with reservoirs 10 and 11, which, where separation is to be brought about by an electrical field, may be made of graphite or other conductive material. Capillary tube and electrodes are designated 12, 13, and 14, respectively. While reservoirs 10 and 11 are shown as having equal volumes, these are desirably proportional to the volumes of $\alpha$ and $\beta$ in the eutectic. The relative levels of the capillary tube 12 and the reservoirs 10 and 11 are determined by the freezing pattern, with a view to preventing blocking of the flow of liquid into the tube before freezing is complete. The freezing pattern is, in turn, determined by the conductivity of the reservoir walls and the relative densities of the solid and liquid phases. While it would appear that the capillary tubes of both the apparatus of FIGS. 3A and 4 should be insulating, and this is generally desirable, the usually attendant low thermal conductivity is undesirable from the standpoint of heat removal. In certain instances it may be feasible to use a thin-wall tube of stainless steel or other conductive material which, while it contributes to Joule heating, nevertheless permits the passage of larger currents due to its lower thermal impedance. This choice, as between conducting and non-conducting walls, as well as other design considerations, is facilitated by studies set forth in the literature (see, for example, "Elektrolytische Wanderung in flussigen und festen Metallen," K. E. Schwarz, J. A. Barth, Leipzig (1940)).

It has been noted that problems attendant on comparatively low electrical conductivities in the solid phase may be avoided by the use of an apparatus arrangement providing for freezing of $\alpha$ and $\beta$ phases on surfaces out of the current path. Such arrangements, useful also in the treatment of fused salts manifesting low conductivity in the solid, are exemplified by the apparatus of FIG. 5. The apparatus differs from that discussed previously 30 and 31 separated by a porous insulating barrier 32 and provided with anode and cathode 33 and 34, respectively. The apparatus differs from that discussed previously in that the bulk liquid is maintained at a temperature higher than that corresponding with the liquidus temperature of the most highly enriched, highest melting point composition resulting, and provides instead for the freezing of $\alpha$ and $\beta$ crystals on internally cooled members 35 and 36 which, in the most simple instance, are both maintained at a temperature T'. The apparatus is depicted at an intermediate phase in processing and so shows initial layers of frozen $\alpha$-phase material 37 and $\beta$-phase material 38.

Discussion has thus far been in terms of the treatment of systems in which conduction is, in large part, electronic. Systems of this type, in which the electrical field is produced in large part by electronic flow, are most convenient from a pedagogical standpoint in distinguishing between the use of electrical fields here under discussion and conventional processes of electrolysis. The functions of current flow resulting in the field and ionic separation are recognized as distinct. The ions which do not carry current migrate in opposite directions and are so separated. The electrons, which do carry the current, merely serve as the means of establishing the electrical current in the liquid that causes the migration. However, while more involved considerations must be taken into account, the inventive procedures herein may operate with equal or even greater facility on eutectic mixtures of salts or oxides. Advantages in the treatment of such materials, as compared with conductive metals, accrue from the fact that larger fields may be produced for a given amount of Joule heating, so resulting in more rapid separation. This follows from the fact that ionic mobilities, and consequently the expected order of differential mobilities for such ionic materials, are of the same general order as for metals. On the other hand, such materials have the disadvantage that, to the extent their conduction is ionic, electrode reactions may have to be considered. Also, as already noted, electrical conductivity in an ionic conductor is often much smaller in the solid than in the liquid, so that solid is usually not permitted to block the current.

Figure 6:
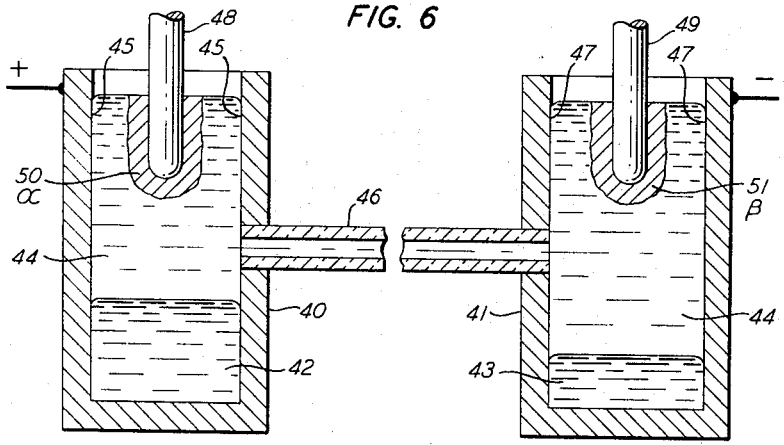
FIG. 6 is an elevational view, partly in section, of apparatus suitable for the separation of compound systems.

The field freezing of a fused salt or oxide mixture of the type AB-AC, where A denotes the common metallic cation and B and C, different anions, or of an AC-BC (common anion) system, may be carried out on the apparatus of FIG. 6. The apparatus there depicted consists of reservoirs 40 and 41, which again may be constructed of graphite or other conductive material. Where the system under treatment is of the type AB-AC, each graphite crucible additionally contains an electrode of metallic A (42 and 43), here shown as if molten, as well as eutectic liquid 44 to be separated. Current assumed to be solely ionic is carried entirely by A ions which form at the anode surface 45, migrate through the capillary 46, thereby setting up an electric field, and are reduced to metal at the cathode surface 47. Meanwhile, anions B and C, assumed to differ in mobility, migrate in opposite directions but take no part in the flow of current. Internally cooled members 48 and 49 are maintained at temperature T', as hereinbefore defined. When the liquidus temperatures in the reservoirs rise to T', $\alpha$- and $\beta$-phase materials 50 and 51 freeze out as shown. At the end of the operation, essentially all of the liquid 44 will have solidified as $\alpha$ or $\beta$ and metal A will have been transferred in the negative reservoir in amount proportional to the product of current and time.

The above AB-AC system is a special use of the AB-CD system (A and C both metals). AB-CD mixtures may be separated as discussed with electrodes 42 and 43 containing the metal which deposits cathodically at the lower voltage.

To separate a eutectic of the type AC-BC by field freezing, where C may, for example, be chloride, a chlorine cathode may be used with provision for recirculation of chlorine gas evolved at the anode back to the cathode.

These considerations can be extended to more complex systems, for example, ternary liquids in which the third component might be water, or a metal soluble in either of the ionic compounds. In the latter case the electrons of the molten metal might carry all the current with none of the other ions involved. In that event, electrode reactions would be avoided and the separation of $\alpha$ and $\beta$ could be performed as described for metallic liquids.

It is evident that, while electric field separation is generally considered the preferred mode of operation, the progressive freezing technique described herein may be applied to mixtures in which separation is effected by other means, either alone or in combination with the use of an electric field. It has been noted in the past by workers in the art that separation may be brought about by use of gravitational fields and magnetic fields, as well as thermal fields. While the first two are of limited utility and perhaps applicable to only a minority of systems encountered, the use of a thermal field or gradient has almost universal utility.

A two or more component liquid solution placed in a thermal gradient develops a compositional gradient. For thermal gradients of the order of from 10° C. to 100° C./cm., the composition difference is usually small, although it may be of the order of several percent. If the operation is carried out in a Clusius column, the countercurrent flows of hot and cold liquid can greatly enhance the compositional gradient. Such an apparatus is depicted schematically in FIG. 7. The most simple form of Clusius column, as depicted, consists of a vertical enclosure 60 terminating at either end in enlarged portions 61 and 62. The apparatus is filled with eutectic solution, again with provision, not shown, for expansion or contraction brought about by freezing, and one wall of the restricted enclosure, such as right-hand wall 63, is heated or is maintained at a temperature higher than that of opposite, or left-hand wall 64, the temperatures of both of walls 63 and 64, however, being maintained above the freezing point of the most highly enriched phase produced in the system. Distribution of components due to the thermal gradient between walls 63 and 64, resulting in an assumed migration of A to a hot wall 63, is accentuated by the countercurrent flows indicated by arrows 65 and 66, so resulting in an A-rich $\alpha$ phase in the upper enlarged portion 61 and a B-rich $\beta$ phase in the enlarged portion 62. Maintenance of cooling coils 67 and 68 at different temperatures as hereinbefore described results in separation of the melt into separate crystalline fractions of $\alpha$ on 67 and $\beta$ on 68.

The operation carried out in the apparatus of FIG. 7 has been described in fundamental terms. It is evident that this operation can be carried out on more complex systems including any of those discussed previously, and that further separation may be produced by feeding either the $\alpha$ or the $\beta$ phase into the same or a similar piece of apparatus, melting, and repeating the operation.

The separation of walls 63 and 64 of the Clusius column may range from of the order of 0.025 to the order of 0.10 cm., typically being about 0.05 cm., while the height of the column may range from one to several feet or more. The essential features of the thermal diffusion method have been described. Many variations of the apparatus can be envisaged. A different apparatus is depicted in FIG. 8. This apparatus consists of receptacles 70 and 71, partially separated by walls 72 and 73, which are in turn set a distance of from 0.025 to 0.10 cm. apart. The principle of the Clusius column is retained by passing coolant through path 74 in wall 72 and by means of heater 75 in wall 73. Countercurrent flows accentuate the separation in the gradient so produced in the manner described in conjunction with FIG. 7, with $\alpha$ and $\beta$ materials 76 and 77 freezing out on the surfaces of internally cooled freezing members 78 and 79, respectively. More efficient operation is assured by use of stirring means such as 80 and 81.

Again, the technical literature is helpful in supplying information as to suitable gradients and flow rates for various systems (see, for example, Techniques of Organic Chemistry, vol. 3, part I, 2d ed. 1956, Interscience Publishers, New York).

The following examples illustrate systems amenable to processing by the inventive procedures.

*Example 1.—Bismuth-tin eutectic*

A eutectic alloy of 43 atomic percent bismuth is melted in an evacuated glass tube and allowed to flow through a constriction in the tube (so as to remove oxide skin) into a glass tube of bore area 2.2 mm.$^2$, and 20 cm. long, with molybdenum electrodes at either end. The tube is maintained above the melting point of the eutectic, 144° C., so as to prevent freezing and possible cracking.

The tube is placed in an oven whose temperature is controlled by a thermocouple in close thermal contact with the column of metallic alloy. The Joule heat of the current, the cooling provided by a flow of nitrogen, together with the ambient heat furnished by the oven maintain the liquid at about 150° C. The current of 450 amp/cm.$^2$, corresponding to a field of about 0.1 volt/cm., causes tin to migrate to the negative electrode and bismuth to the positive electrode. Tin-rich $\alpha$ solid solution freezes at the negative electrode and bismuth rich $\beta$ solid solution freezes at the positive electrode progressively inward from the electrodes, until the entire liquid is frozen.

*Example 2.—Gold-germanium eutectic*

Molten gold-germanium eutectic is poured into an apparatus like that of FIG. 6, while at a temperature somewhat above 356° C. to prevent cracking of the glass capillary by unintentional freezing. The volumes of metal in the reservoirs are around 2 cubic cm. each, but in the relative proportions of about 2.1 to 1 in the gold (positive) and germanium (negative) compartments, respectively. The glass capillary was 20 cm. long and 2.2 mm.$^2$ in bore area. The current density was 820 amp/cm.$^2$. Gold containing some germanium in solid solution froze in the positive graphite compartment, while essentially gold-free germanium froze in the negative compartment. The extreme walls of the compartments were maintained at $T'=366°$ C. by conduction of heat by heavy copper electrodes extending outside the hot zone of the furnace. A flowing nitrogen atmosphere was used.

*Example 3.—$NaF$-$PbF_2$ eutectic*

Figure 5:
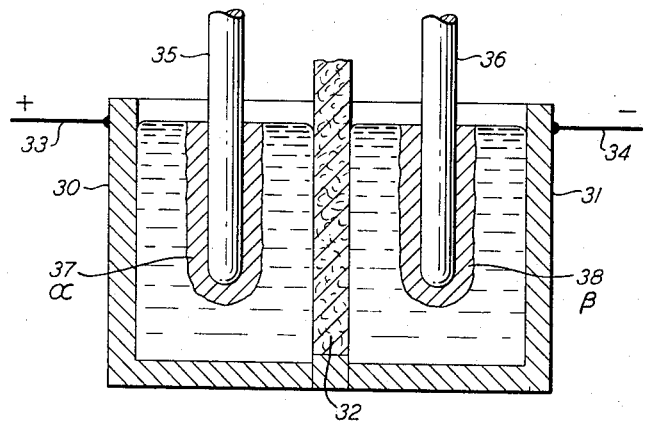
FIG. 5 is an elevational view, partly in section, of yet another type of apparatus particularly suitable for operation on a particular class of compositions.

Apparatus like that of FIG. 5 is filled with $NaF$-$PbF_2$ eutectic, containing about 67 mol percent of $PbF_2$, and placed in a furnace controlled to maintain the liquids in the compartments at about 575° C. Internally gas cooled graphite freezing members, electrically neutral, are maintained in each liquid at a temperature of about 565° C. Molten lead pools, resting at the bottom of each graphite compartment serve as anode and cathode. A potential difference of 1.5 volts is applied across the porous barrier, which may be of fritted silica of about 0.5 cm. thickness. Passage of current, by means of lead ions migrating from anode to cathode causes sodium ions to concentrate in the cathode compartment and lead ions in the anode compartment until they reach such concentration as to freeze out as $NaF$ and $PbF_2$ on the freezing members. During the process there is a net migration of molten lead from anode compartment to cathode compartment which occurs.

*Example 4.—$MoO_3$-$WO_3$*

A fused silica tube in apparatus like that of FIG. 3A is filled with a molten eutectic containing about 2.5 mol percent of $WO_3$ at a temperature above about 789° C. A field of about 2 volts per cm. is applied between molybdenum electrodes at the ends of the tube, which is of about 2 mm. bore. The tube is externally flushed with nitrogen such that a substantially uniform temperature $T'=780°$ C. is maintained in the molten electrolyte by the Joule heat of the current. $MoO_3$ concentrates at the negative electrode and freezes out, while $WO_3$ does the same at the positive electrode.

*Example 5*

This example pertains to the use of thermal diffusion in separation of lead-tin (38.1 weight percent lead), using the apparatus of FIG. 8. Members 78 and 81 are maintained at a temperature ($T'$) of 185° C. (2° above the eutectic temperature). The temperature of hot wall 73 is maintained at 200° C. and that of cold wall 72 at 190° C. The slit width or separation between the hot and cold walls is 0.020 inch. Lead migrates to the cooler wall and lead-rich liquid descends to the lower reservoir. Lead-rich solid solution crystals freeze out on freezing member 78. Similarly, tin-rich liquid rises along hot wall 73 and tin-rich solid solution crystals freeze out on member 81.

In general, it may be stated that eutectic components capable of being redistributed by the application of a field so resulting in at least one localized composition having a liquidus temperature of the order of 1° higher than the eutectic temperature, $T_e$, may be separated by the processes herein. While it is inexpedient to set forth all known systems capable of being so processed, persons skilled in the art will recognize that comparatively few, if any, systems will defy processing. It has been stated that the preferred embodiment herein is the use of an electric field, either alone or in conjunction with an additional influence. Several eutectics which may be separated by use of an electric field are set forth below. Eutectic compositions and temperatures are also indicated.

*Metallic binary systems.*—Bi-Sn, Au-Ge, Ag-Al, Bi-Cd, Bi-Pb, Cd-Pb, Cd-Sn, Pb-Sn, Pb-Zn.

*Salts.*—$NaF-PbF_2$, $NaF-AlF_3$, $NaF-CdF_2$, LiCl-KCl, $CdBr_2-ZnBr_2$, $LiCl-BaCl_2$, KF-LiF, NaF-LiF, $CaF_2$-NaF.

*Oxides.*—$NaF - PbF_2$, $Na_2O - Na_2O \cdot MoO_3$, $TiO_2$ - CaO, $FeO-TiO_2$, $MgO-TiO_2$, $V_2O_5$-PbO, $SiO_2$-$TiO_2$, $MoO_3$-$WO_3$.

*Three oxides.*—$Li_2O \cdot B_2O_3$-$Na_2O \cdot B_2O_3$.

*Oxide-halide.*—$PbF_2 \cdot PbO$, $Li_2WO_4$-LiF.

*Minimal melting point solid solution.*—$LiF-MgF_2$, K-Cs, Rb-Cs, Ti-V, Mn-Ni.

The invention has been described in terms of a limited number of embodiments. Variations on designs discussed have been proposed. Others are apparent. The essence of the invention is the removal of non-eutectic compositions for simplicity designated α and β (even though for certain systems this terminology is unconventional) by progressive freezing. Regardless of the influence resulting in initial redistribution (here designated as "field"), be it electrical, gravitational, thermal, magnetic, et cetera, removal is effected by maintenance of at least a portion of the liquid at a temperature above the eutectic temperature $T_e$ but equal to or below the liquidus temperature of an enriched composition resulting by use of the separating influence or field. Further, while initial separation may be carried out in a material which is off eutectic stoichiometry, eventual (or initial) separation of the eutectic in a progressive manner generally requires removal of material of two phases simultaneously. It has been assumed, for simplicity, in the description of certain of the embodiments herein that the temperature resulting in freezing of both phases is equal to some temperature T'. It is, however, evident, and it has been noted, that certain conditions may dictate the use of different temperatures at the two freezing interfaces. It has been noted that T' should be at least one degree above the eutectic temperature $T_e$.

The maximum effective temperature of an interface corresponds with the liquidus temperature of the most highly enriched phase that can be produced by the influence applied at that interface, with an absolute maximum equal to the freezing point of a pure component attracted to that interface. It is seen that the temperatures of the two interfaces may therefore differ and may have different maximum values, however, while sharing the same minimum, above noted.

In certain instances, notably where the eutectic composition is close to that of one of the components, it may be desirable to freeze out only one phase, which will usually be that corresponding to the higher melting component, from a liquid originally of eutectic or near-eutectic composition. This may be for the purpose of securing a more perfect crystal of that phase, or one free from even small amounts of the opposite phase. In this event, field-freezing will change the net composition of the remaining liquid in a direction away from the composition of the freezing phase, and this will occur if T' is above the freezing point of the pure component nearer which the eutectic composition lies. The process normally will end when the composition of the liquid in the vicinity of the freezing phase attains a liquidus temperature which is below the T' maintained at the freezing surface.

The use of a constant temperature across the entire liquid body, while practical where the influence takes the form of an electric field in the separation of a metallic system or other material evidencing reasonable solid state conductivity, may be impractical as noted where solid state conductivity is low. In such instances, it has been noted that freezing may desirably be carried out at an interface removed from the electrical path. Where the separating influence takes the form of a thermal gradient, this separating means inherently prohibits the use of a constant temperature T' across the entire body of liquid. Where it is desired to maintain a constant temperature T' at both the freezing interfaces in a system undergoing phase transformation by use of a thermal gradient, this may be accomplished by separating the freezing interface corresponding with the low end of the gradient from the main apparatus by a flow path through which liquids are caused to move by means of convection or a pumping means. Other alternative techniques are apparent.

What is claimed is:

1. Process for redistributing at least two components of a system having a composition approximately corresponding with a minimum melting composition of the said system comprising imposing a D-C electric field between two spaced conducting surfaces immersed in a liquid body of the said system, the said field being such as to result in the concentration of at least one component of the said system to the extent necessary to produce a local liquid composition having a freezing point at least 1° C. higher than the temperature corresponding with the freezing point of said minimum melting composition, while maintaining a temperature having a maximum value equal to the freezing point of the said local composition in a position in the liquid body approximately corresponding with said concentration, said position being spaced from either of said conducting surfaces.

2. Process of claim 1 in which the applied field is at least 0.02 volt/cm. and in which the differential mobility of ions of the said at least two components is at least $3 \times 10^{-5}$ cm.$^2$/sec. under the said applied field.

3. Process of claim 2 in which the said system is a eutectic system.

4. Process of claim 2 in which system at least one of the components is a salt.

5. Process of claim 2 in which at least two of the said components are salts and in which application of the said electric field results in ionization of the said components to produce a common ion.

6. Process of claim 5 in which the said conducting surfaces consist essentially of the element corresponding with said common ion.

7. Process of claim 2 in which at least one of the components is an oxide.

8. Process of claim 2 in which the said system is a non-eutectic, minimal melting point composition.

References Cited

UNITED STATES PATENTS 2,711,379   6/1955   Rothstein _____ 204—180

OTHER REFERENCES

Drakin: Izv. Sektora Fiz.-Khim. Analiza, Inst. Obshch. Neorgan. Khim., Akad. Nauk SSSR, 1950, vol. 20, pp. 341 to 344.

ROBERT K. MIHALEK, *Primary Examiner.*

JOHN H. MACK, *Examiner.*

E. ZAGARELLA, *Assistant Examiner.*